US011014393B2

(12) United States Patent
Morii et al.

(10) Patent No.: US 11,014,393 B2
(45) Date of Patent: May 25, 2021

(54) IMAGE TRANSFER SHEET, MANUFACTURING METHOD FOR IMAGE TRANSFER SHEET, AND IMAGE TRANSFER METHOD

(71) Applicant: ING CO., LTD., Osaka (JP)

(72) Inventors: Tomoko Morii, Osaka (JP); Masamitsu Aiba, Osaka (JP)

(73) Assignee: ING CO., LTD., Osaka (JP)

( * ) Notice: Subject to any disclaimer, the term of this patent is extended or adjusted under 35 U.S.C. 154(b) by 0 days.

(21) Appl. No.: 16/198,037

(22) Filed: Nov. 21, 2018

(65) Prior Publication Data
US 2019/0092064 A1 Mar. 28, 2019

Related U.S. Application Data

(63) Continuation of application No. PCT/JP2017/019508, filed on May 25, 2017.

(30) Foreign Application Priority Data

May 27, 2016 (JP) .............................. JP2016-106167

(51) Int. Cl.
  *B41M 5/025* (2006.01)
  *B32B 7/06* (2019.01)
  (Continued)

(52) U.S. Cl.
  CPC ............. *B41M 5/0256* (2013.01); *B32B 7/06* (2013.01); *B32B 27/10* (2013.01); *B41M 5/00* (2013.01);
  (Continued)

(58) Field of Classification Search
  CPC ........ B41M 5/0256; B41M 5/00; B41M 5/03; B41M 7/0081; B41M 5/40; B32B 7/06;
  (Continued)

(56) References Cited

U.S. PATENT DOCUMENTS 4,454,179 A 6/1984 Bennett et al.
4,999,076 A 3/1991 Incremona et al.
(Continued)

FOREIGN PATENT DOCUMENTS

CN 87103691 A 4/1988
CN 104203592 A 12/2014
(Continued)

OTHER PUBLICATIONS

"Smart Paper." ING CO., LTD. 2014 Retrieved from http://ing-global.net/smartpaper/toner/.

*Primary Examiner* — Scott A Richmond
(74) *Attorney, Agent, or Firm* — Rabin & Berdo, P.C.

(57) ABSTRACT

An image transfer sheet includes a release paper, a glue layer, the glue layer having a lower surface removably glued to an upper surface of the release paper, a transfer film having a release property with respect to the image layer and an easy adhesion property with respect to the glue layer, and an image layer partially between the transfer film and the glue layer, a lower surface of the transfer film being in contact with the image layer at a portion where the image layer is present and in contact with the glue layer at a portion where the image layer is not present.

9 Claims, 5 Drawing Sheets

(51) Int. Cl.
*B32B 27/10* (2006.01)
*G09F 3/02* (2006.01)
*B44C 1/17* (2006.01)
*B41M 5/00* (2006.01)
*B41M 5/03* (2006.01)
*B41M 7/00* (2006.01)

(52) U.S. Cl.
CPC ............ *B41M 5/03* (2013.01); *B41M 7/0081* (2013.01); *B44C 1/17* (2013.01); *B44C 1/1741* (2013.01); *G09F 3/02* (2013.01)

(58) Field of Classification Search
CPC .. B32B 27/10; G09F 3/02; B44C 1/17; B44C 1/1741; B44C 1/1733; C09D 11/101
See application file for complete search history.

(56) References Cited

U.S. PATENT DOCUMENTS

| | | |
|---|---|---|
| 6,264,786 B1 | 7/2001 | Cromett |
| 9,079,681 B1 * | 7/2015 | Schwendimann ............................ B41M 5/38214 |
| 2007/0237562 A1 * | 10/2007 | Kato ....................... B41J 15/044 400/208 |
| 2008/0302470 A1 * | 12/2008 | Sumita ...................... B44C 1/17 156/241 |
| 2015/0246528 A1 | 9/2015 | Takeuchi et al. |
| 2015/0292150 A1 | 10/2015 | Ikeda et al. |
| 2016/0351082 A1 * | 12/2016 | Barnhardt ................. G09F 3/10 |

FOREIGN PATENT DOCUMENTS

| | | |
|---|---|---|
| CN | 104797432 A | 7/2015 |
| JP | H06-210963 A | 8/1994 |
| JP | 2002-103892 A | 4/2002 |
| JP | 2009-107315 A | 5/2009 |
| JP | 2009-160757 A | 7/2009 |
| JP | 2009-269255 A | 11/2009 |
| JP | 2010-099940 A | 5/2010 |
| KR | 100011816 B1 | 12/1994 |

* cited by examiner

IMAGE TRANSFER SHEET, MANUFACTURING METHOD FOR IMAGE TRANSFER SHEET, AND IMAGE TRANSFER METHOD

CROSS REFERENCE TO RELATED APPLICATIONS

This application is a continuation under 35 U.S.C. 120 of International Application PCT/JP2017/019508 having the International Filing Date of May 25, 2017, and having the benefit of the earlier filing date of Japanese Applications No. 2016-106167, filed on May 27, 2016. Each of the identified applications is fully incorporated herein by reference.

BACKGROUND OF THE INVENTION

Technical Field

The present invention relates to an image transfer sheet for transferring an arbitrary image to a transfer target, a manufacturing method for the image transfer sheet, or an image transfer method to a transfer target with the use of the image transfer sheet.

Background Art

Regarding transfer printing for transferring an image onto a transfer target, techniques such as water transfer, thermal transfer, sublimation transfer and dry transfer have been known. Especially, the dry transfer technique in which an adhesive is applied to the back side of an image layer temporarily attached onto a carrier sheet, and then the image layer is transferred and glued to a surface of a transfer target by pressing has such characteristics that the image appears to be printed directly on the transfer target because a frame does not remain on the image when transferred, and post-processing with a cutting plotter or the like is not required.

As a transfer sheet for dry transfer and a method for manufacturing the transfer sheet, prior art, for example, a dry transfer paper and a manufacturing method thereof described in Japanese Patent Application Laid-Open No. H6-210963 (hereinafter referred to as the "prior art") have been proposed. According to the prior art, since an adhesive is not applied to a region other than the image layer, there is an advantage that the transfer target is not contaminated. However, the prior art includes a step of making an image layer as a light shielding image and then modifying and curing a photosensitive material by an exposure process, and therefore, as a matter of course, the image layer must shield light, and the color and color tone of the image are limited. Moreover, it is necessary to include a step of irradiating the photosensitive material with light and a step of removing the uncured photosensitive material with a solvent after the light irradiation, and consequently the manufacturing process is complicated, the cost is increased, and the use of solvent or the like causes a problem of environmental burden.

The inventors of the present application have tried to simplify the dry transfer technique, and developed and sold the product "Smart Paper" (product name: hereinafter referred to as the "prior art") described in the applicant website (URL: http://ing-global.net/). According to the prior art, an image layer is formed by printing an image as a mirror image by toner printing with a laser printer or the like, on a carrier sheet made from PET (polyethylene terephthalate) with a surface treated to be releasable, an acrylic-based glue is applied to the image layer and dried, and then the carrier sheet is adhered to a transfer target, pressure is applied and the carrier sheet is peeled, and consequently only the image layer is glued as the normal image to the transfer target and the transfer is completed. The prior art is not only extremely simple regarding the process, but also does not use solvents or the like and therefore does not cause a problem of environmental burden. Moreover, since water is not used and heat is not applied for the transfer, a wide range of materials are applicable for the transfer target, such as paper, wood, leather, fiber (cloth), ceramics as well as metal, glass and synthetic resin. Further, since the image layer is temporarily attached onto a flexible carrier sheet and then transferred, it is also possible to transfer the image layer to a three-dimensional object or a curved surface that cannot directly pass through a printer. As described above, the prior art has the effects of reducing the cost of dry transfer, expanding the range of application, simplifying and improving the efficiency of the operation (see a description of "Smart Paper" (the applicant website page) URL: http://ing-global.net/smartpaper/index.html?id=movie)

On the other hand, as a printing technique other than toner printing with a laser printer or the like, it is conceivable to adopt UV printing which has been popular in recent years. UV printing is a printing technique which applies a UV ink having a quick drying property to a surface of a printing target from a non-contact printer head similar to an ink jet printer, and forcibly dries (cures) the ink by immediate UV (ultraviolet light) irradiation. UV printing has advantages, such as high working efficiency because of short drying time, allowing printing on a special material that is nonabsorbent and hard to dry, high print coating strength (fastness) and excellent durability, and also has an advantage of allowing an image layer to be formed with thick raised ink and thereby providing a stereoscopic, high texture quality printed image that is particularly suitable for package printing and the like. In addition, although toner printing with a laser printer or the like can basically print only on a plane such as paper, UV printing can print directly on a plane having a certain thickness or irregularities and also on a three-dimensional object having a surface curved to some extent. However, UV printing not only has a limitation in terms of the thickness and curved surface of printing targets that can be dealt with, but also requires to precisely set the stereoscopic printing position for a UV printer at the time of printing and also requires, in some case, a jig for properly holding a printing target, and thus limitations in terms of time and cost have been problems.

Then, the inventors of the present application did research and repeatedly tried to form image layers of the prior art by UV printing. As a result, the inventors confirmed that UV printing of an image on a carrier sheet by the prior art is possible, but, since it is necessary to mirror print the image in the first place, there is a problem that it is difficult to form a stereoscopic image layer, which is a feature of UV printing. Moreover, other problems were found: volatilization of the glue applied to the image layer was insufficient, and bubbles occurred between the image layer and the transfer target over time after the transfer, or the image layer itself became wavy. In printing with a conventional laser printer, toner that is fine particles of paint is adhered to a transfer paper by static electricity, and fixed by heat or light. Therefore, in the image layer, there is space between the toner particles and the volatile component of glue passes and diffuses through the space when drying the glue after the transfer, and consequently the volatile component hardly remains in the glue layer and bubbles and waves hardly occur. On the other hand, in UV printing, since the ink polymerizes and binds in a photopolymerization reaction with UV of a specific wavelength, not only the image layer to be formed is thick, but also has less space, resulting in a cause of the above-mentioned bubbles and waves. Further, in the prior art, it is necessary to manually apply the glue with a brush, a sponge, etc. according to the image layer after printing, and thus there is also a problem in the aspect of work efficiency.

SUMMARY OF THE INVENTION

It is an object of the present invention to solve the above-mentioned problems of the prior art and to provide an image transfer sheet capable of transferring a stereoscopic image, which is a feature of UV printing, to a transfer target of a wide range of material, particularly to a surface of a three-dimensional object having a curved surface, to give such a finish as if the image is printed directly, and capable of being manufactured by a minimum number of steps using a UV printer; a manufacturing method for the image transfer sheet; and an image transfer method using the image transfer sheet. Furthermore, it is an object of the invention to provide an image transfer sheet capable of transferring an image layer formed on a release paper by a non-contact printer including a laser printer and an inkjet printer but not necessarily be limited to UV printing, to a transfer target without manually applying a glue to the image layer; a manufacturing method for the image transfer sheet; and an image transfer method using the image transfer sheet.

In order to solve the above-mentioned problems, an image transfer sheet according to claim 1 of the present invention includes an image layer partially between a transfer film as an upper layer and a glue layer as a lower layer, the glue layer having a lower surface glued removably to an upper surface of a release paper, wherein the transfer film has a release property with respect to the image layer and an easy adhesion property with respect to the glue layer, and a lower surface of the transfer film is in contact with the image layer at a portion where the image layer is present and in contact with the glue layer at a portion where the image layer is not present.

According to this configuration, the lower surface of the glue layer is exposed by peeling and removing the releasable release paper from the image transfer sheet. By adhering the lower surface of the glue layer to a surface of a transfer target and applying pressure, the image transfer sheet is attached to the transfer target by the adhesive power of the glue layer. Next, when the transfer film on the uppermost surface of the image transfer sheet is peeled and removed, the image layer remains as it is on the upper surface of the glue layer at a portion where the image layer for which the transfer film has a release property is present. Meanwhile, at a portion where the image layer is not present, the glue layer remains glued to the lower surface of the transfer film and is peeled and removed from the surface of the transfer target in this state. As a result, only the image layer is glued to the surface of the transfer target with the glue layer, and the image transfer is completed.

A conventional dry transfer technique basically forms an image layer of a mirror image on a carrier by printing or the like, and then inverts and transfers the image layer to a transfer target by pressure or heat, or adhesive means such as an adhesive (glue), to obtain a printed image of a normal image. On the other hand, the invention of the present application is based on a reverse thinking, that is, an image layer of a normal image is directly printed on a surface of a glue layer of a sticky sheet prepared beforehand, and the image layer is glued as it is to a transfer target.

It should be noted that the transfer film has a highly easily adhering property with respect to the glue layer, and, for example, if the glue is a general pressure-sensitive adhesive containing an acrylic-based resin as a main component, the same acrylic-based resin film is suitable for the transfer film. On the other hand, the release paper has a release property with respect to the glue layer, and, for example, a siliconized paper having a silicon film formed on the surface of paper is suitable with respect to the pressure-sensitive adhesive.

The invention specified in claim 2 is the image transfer sheet according to claim 1, wherein the image layer is an ink printed on an upper surface of the glue layer by a non-contact printer. The invention specified in claim 3 is the image transfer sheet according to claim 2, wherein the image layer is a UV ink printed on the upper surface of the glue layer by a UV printer.

The non-contact printer is a laser printer, an ink jet printer, a UV printer or the like, which is a type of printer that directly drops an ink onto a printing surface without using a plate material or a transfer body for contact with the printing surface. The image layer according to the invention of the present application is formed by dropping ink particles on the upper surface of the glue layer and drying and curing a layer of the ink droplets to form a film, and then glued to a transfer target through the glue layer. Therefore, although a penetration ability to the transfer target is not matter, it is desirable for the ink to have a penetration ability to the glue layer from the viewpoint of preventing peeling off of the image layer after dried and cured. The UV ink is formed by combining a pigment as a dye with a photoinitiator that excites a photopolymerization reaction by UV, and a monomer/oligomer that is polymerized by the photopolymerization reaction. Mercury lamps and metal halide lamps are known as light sources of UV, but a metal halide lamp having a high long-wavelength output and a high penetrating power with respect to the pigment is more suitable for the formation of a highly stereoscopic image layer with a large thickness.

The invention specified in claim 4 is a manufacturing method for an image transfer sheet, including: a printing step of partially providing an image layer by printing an ink with a non-contact printer, on an upper surface of a glue layer of a sticky sheet having the glue layer formed releasably on an upper surface of a release paper; and an attaching step of attaching a transfer film to an upper surface of the sticky sheet having the image layer so that a lower surface of the transfer film is in contact with the image layer at a portion where the image layer is present and in contact with the glue layer at a portion where the image layer is not present, the transfer film having a release property with respect to the image layer and an easy adhesion property with respect to the glue layer. The invention specified in claim 5 is the manufacturing method for an image transfer sheet according to claim 4, wherein the image layer is a UV ink printed on the upper surface of the glue layer by a UV printer.

The invention specified in claim 6 is an image transfer method including: a printing step of partially providing an image layer by printing an ink with a non-contact printer, on an upper surface of a glue layer of a sticky sheet having the glue layer formed releasably on an upper surface of a release paper; an attaching step of attaching a transfer film to an upper surface of the sticky sheet having the image layer so that a lower surface of the transfer film is in contact with the image layer at a portion where the image layer is present and in contact with the glue layer at a portion where the image layer is not present, and thereby obtaining an image transfer sheet, the transfer film having a release property with respect to the image layer and an easy adhesion property with respect to the glue layer; a release paper removal step of peeling and removing only the release paper from the image transfer sheet; a pressure-bonding step of pressure-bonding a lower surface of the glue layer of the image transfer sheet from which the release paper has been removed to a transfer target; and a film peeling step of peeling and removing the transfer film from the image transfer sheet pressure-bonded to the transfer target. The invention specified in claim 7 is the image transfer method according to claim 6, wherein the image layer is a UV ink printed on the upper surface of the glue layer by a UV printer.

An image transfer sheet, a manufacturing method for an image transfer sheet, and an image transfer method according to the present invention have the following effects. (1) When manufacturing an image transfer sheet, it is possible to form an image layer by forming an arbitrary image as a normal image and layering an ink with a desired thickness within a range available by the specifications of a printer, on the upper surface of a glue layer of a sticky sheet. Therefore, it is possible to achieve a finish as if the image is printed directly on a transfer target, and particularly it is possible to achieve highly stereoscopic printing suitable for package printing and the like by utilizing a feature of UV printing. (2) Since the image is directly printed on a glue layer prepared on a sticky sheet, the step of manually applying a glue as in the prior art can be omitted and there is no need to remove the glue which has spread out of the image and adhered to the surface of a transfer target after the transfer, and consequently the working process can be simplified and the productivity is improved. (3) Since the glue layer can be formed in a dried and stable state on the sticky sheet in advance instead of applying a glue in the form of a solution containing a volatile component of a solvent as in the prior art, there is a little possibility that bubbles are produced by the volatile component or the image layer becomes wavy after the transfer, and thus the quality of finish is improved. (4) Since the image transfer sheet allows an image transfer to a plane or a three-dimensional object of a size and shape on which, in the first place, it is difficult to directly print the image with a printer, advanced settings for the printer and special jigs are not required. Hence, it is possible to significantly reduce the costs of printing on small-lot multi kind products and packages thereof, producing original, customized, mass-produced goods, printing on prototypes and samples at the development stage of products, etc. (5) As a result, since a state in which a transfer image with glue is sandwiched between a protective film and a sheet is realized, it is possible to handle the image transfer sheet in the same manner as conventional image-printed stickers with glue, and it is also possible to easily manufacture a product that allows only transfer printing of an image.

DETAILED DESCRIPTION OF THE INVENTION

First Embodiment

Figure 1:
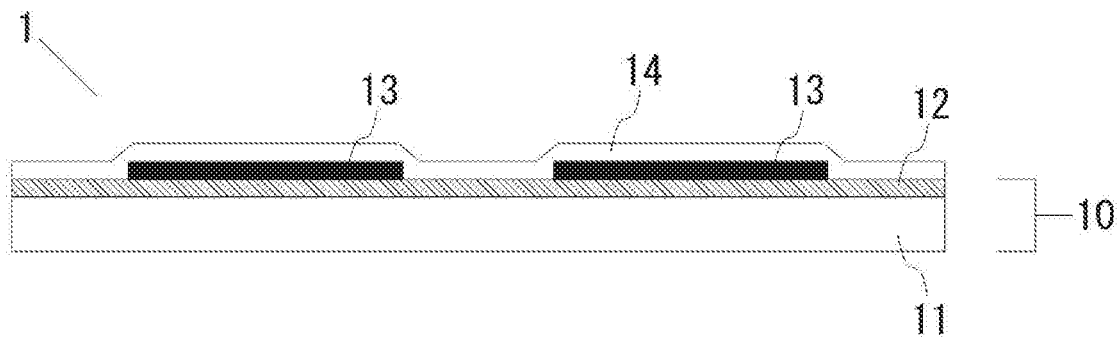
FIG. 1 is a cross-sectional view showing an example of an image transfer sheet 1 according to the first embodiment.

The following will describe an embodiment of the present invention with reference to the drawings. FIG. 1 is a cross-sectional view showing an example of an image transfer sheet 1 according to an embodiment of the present invention. The image transfer sheet 1 has an image layer 13 partially between a transfer film 14 as an upper layer and a glue layer 12 as a lower layer, and the glue layer 12 has a lower surface glued removably to an upper surface of a release paper 11. In the present embodiment, the image layer 13 is a UV ink printed on an upper surface of the glue layer 12 by, for example, a UV printer, and dried and cured in the form of a thin film by causing a photopolymerization reaction with UV irradiation at the time of printing.

When a glue component of the glue layer 12 is an acrylic-based adhesive, as described later, a suitable material for the transfer film 14 is a transparent acrylic-based resin, but is not necessarily limited to this material as long as the transfer film 14 has a release property with respect to the image layer 13 (the transfer film 14 is peelable from the image layer 13) and an easy adhesion property (a highly adhesive property) with respect to the glue layer 12 (the transfer film 14 is easily adhered to the glue layer 12). By making the transfer film 14 transparent, the shape and color of the image are visible from the surface of the image transfer sheet 1, and consequently it is possible to facilitate positioning and color matching during application to a transfer target O. The transfer film 14 can have an arbitrary thickness, but preferably from 12 μm to 100 μm, and more preferably 12 μm to 50 μm in consideration of securing adhesion to the irregularities in the thickness of the image layer, particularly when formed by stereoscopic printing using a feature of UV ink that enables raised printing.

The glue layer 12 is a layer of pressure-sensitive adhesive formed by, for example, adding a tackifier to an acrylic-based resin, and has an arbitrary thickness of, preferably 10 μm to 100 μm, and most preferably about 50 μm. The release paper 11 has a silicone film or the like formed at least on the upper surface thereof, and has a release property with respect to the glue layer 12 and is easily releasable at room temperature.

Figure 2:
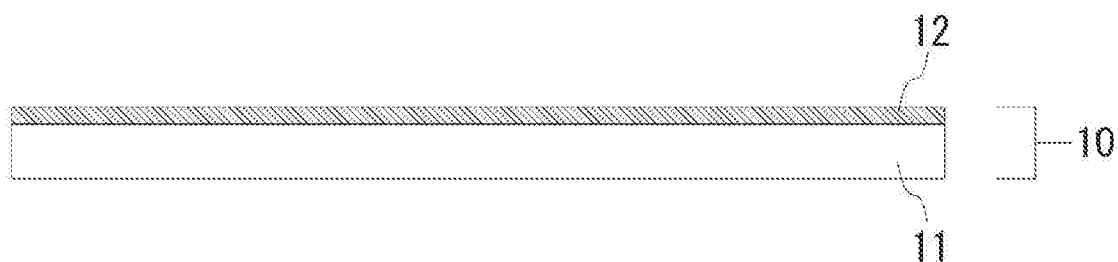
FIG. 2 is a cross-sectional view of a sticky sheet 10.

FIG. 2 to FIG. 5 are schematic cross-sectional views showing, step by step, the processes of a manufacturing method for the image transfer sheet 1 according to the first embodiment of the present invention. FIG. 2 is a cross-sectional view of a sticky sheet 10 including the glue layer 12 formed on the upper surface of the release paper 11 in advance. As the sticky sheet 10, if an existing product of pressure-sensitive double-sided adhesive tape in a sheet form is applicable as it is, the manufacturing efficiency is improved. For instance, at the stage of prototyping, the inventors of the present application tried a pressure-sensitive adhesive (thickness: 45 μm) made from an acrylic-based resin, a polyolefin fiber and a tackifier for the glue layer 12, and a carrier-less pressure-sensitive double-sided adhesive tape of siliconized glassine paper (thickness: 90 μm) for the release paper 11, and generally good results were obtained.

Figure 3:
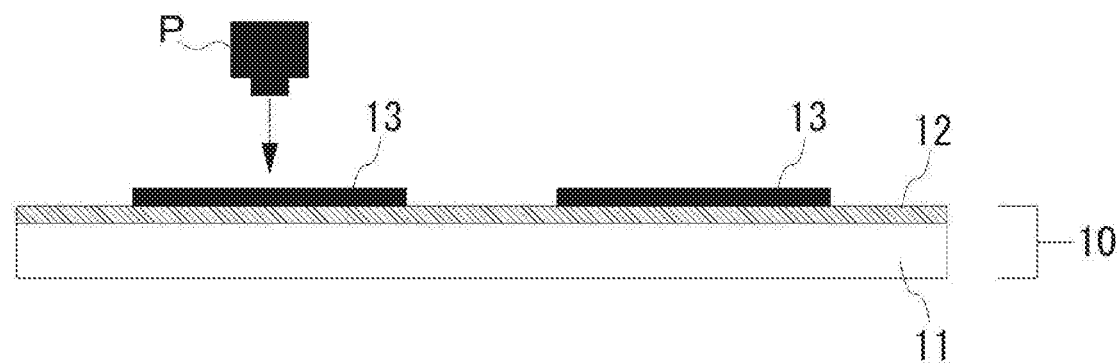
FIG. 3 is a cross-sectional view showing a printing step.

FIG. 3 is a cross-sectional view showing a printing step as a first step. The sticky sheet 10 is set on a non-contact printer and then ink particles of arbitrary color are directly ejected from a printer head P to stick to the upper surface of the glue layer 12, and immediately the ink particles are dried and cured by a photopolymerization reaction with UV irradiation from a UV light source (not shown) to form the image layer 13 in the form of a film in the printed portion. Since the ink particles adhering to the glue layer 12 permeate into the irregularities on the upper surface of the glue layer 12 and are then dried and cured, the ink particles firmly adhere to the glue layer 12. Moreover, since the image layer 13 is printed as a normal image, it is possible to form the image layer 13 stereoscopically with arbitrary thickness within the range of specifications of the printer by performing thick raised printing that is a feature of UV printing, and it is also possible to give accent to the three dimensionality of the image by printing only a specific portion of the image with thick raised printing.

Figure 4:
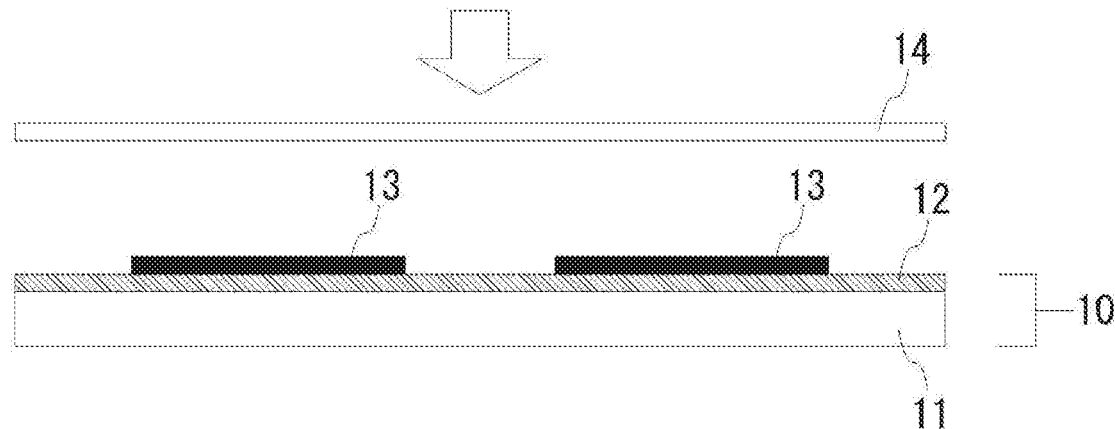
FIG. 4 is a cross-sectional view showing an attaching step.

FIG. 4 is a cross-sectional view showing an attaching step as a second step. The transfer film 14 covering the entire image range is attached to the upper surface of the sticky sheet 10 on which the image layer 13 has been formed. At this time, it is preferable to appropriately apply pressure from the upper surface of the transfer film 14 along the image edge portion so that the glue layer 12 at a portion where the image layer 13 is not present sufficiently adheres and is glued to the lower surface of the transfer film 14. In the case where the image layer 13 is printed by thick raised printing, when pressure-bonding the transfer film 14, it is preferable to use a roller, a press plate or the like using a soft material, such as urethane or sponge capable of absorbing the irregularities of the image layer 13, on the surface thereof and apply pressure so as not to destroy the three dimensionality of the image layer 13.

Figure 5:
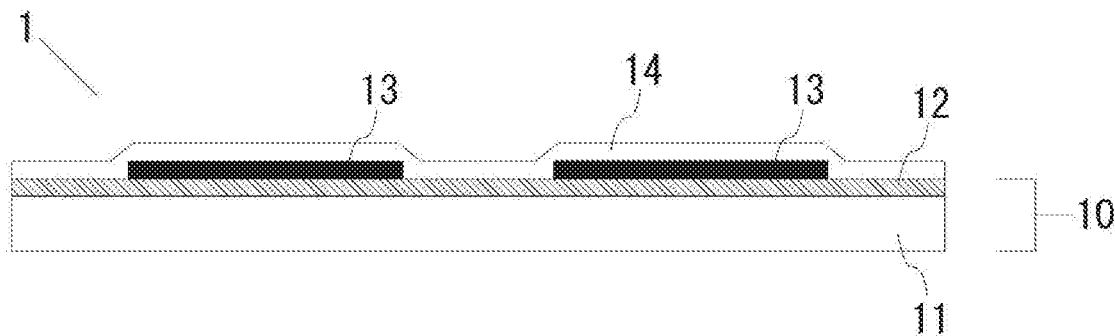
FIG. 5 is a cross-sectional view showing a state in which the image transfer sheet 1 is completed.

FIG. 5 is a cross-sectional view showing a state in which the image transfer sheet 1 is completed as a result of the above steps. The image transfer sheet 1 in such a state can be handled in the same manner as conventional stickers and seals, and can be made a product that can transfer and print only the image.

Figure 6:
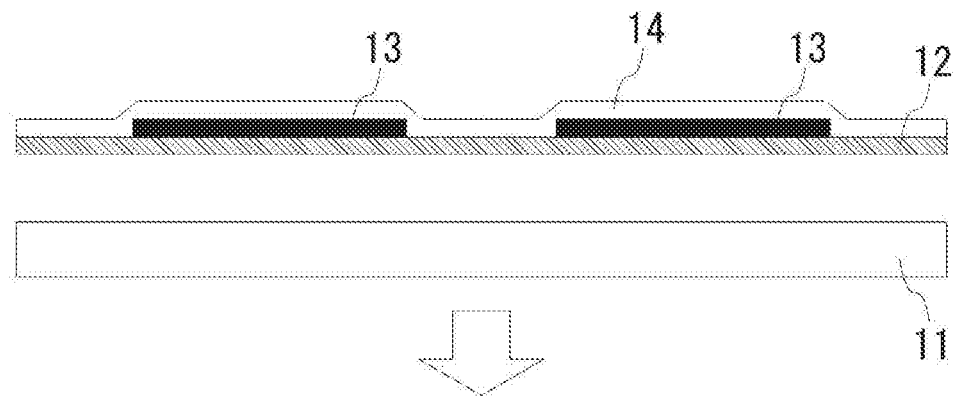
FIG. 6 is a cross-sectional view showing a release paper removal step.
Figure 7:
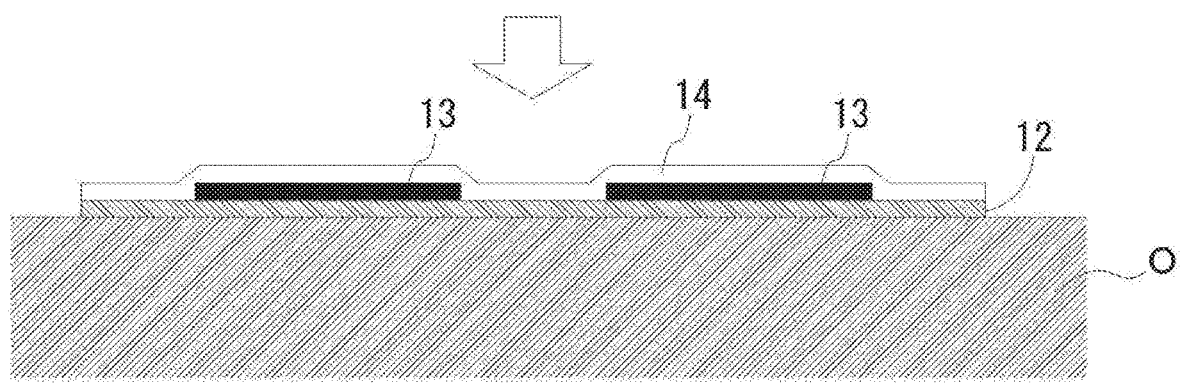
FIG. 7 is a cross-sectional view showing a pressure-bonding step.
Figure 8:
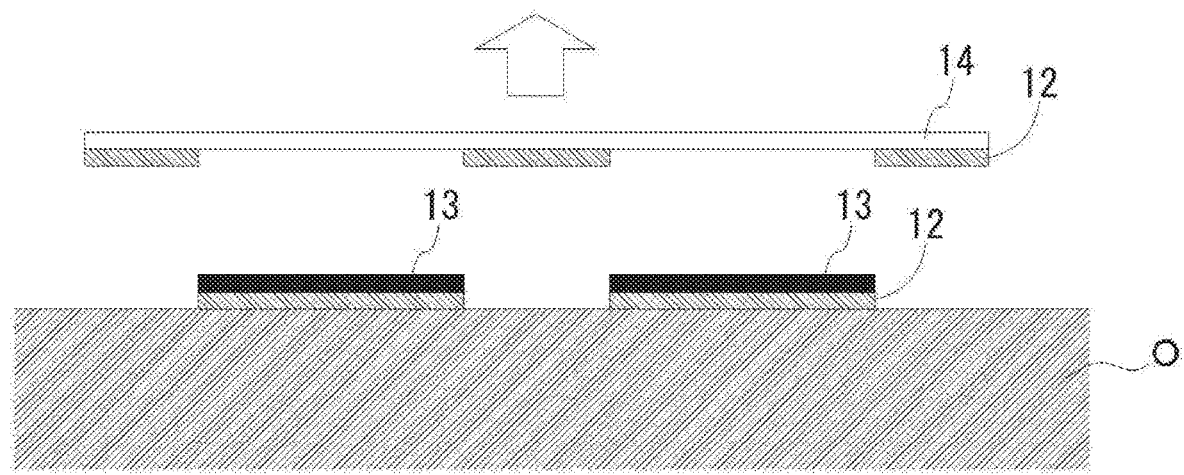
FIG. 8 is a cross-sectional view showing a film peeling step.

FIG. 6 to FIG. 8 are schematic cross-sectional views showing a transfer step of transferring the image layer 13 to a surface of a transfer target O. FIG. 6 is a cross-sectional view showing a release paper removal step of peeling and removing the release paper 11 from the image transfer sheet 1. As described above, since the transfer film 14 has an easy adhesion property with respect to the glue layer 12 and since the image layer 13 firmly adheres to the glue layer 12 in the process of drying and curing after the ink permeates into the glue, when the release paper 11 is peeled, the glue layer 12 which is glued to the transfer film 14 in a portion including the image layer 13 peels off and separates from the release paper 11.

FIG. 7 is a cross-sectional view showing a pressure-bonding step in which the image transfer sheet 1 after peeling and removing the release paper 11 is positioned on a surface of a desired transfer target O, and the lower surface of the glue layer 12 is pressure-bonded to the transfer target O. By applying pressure from above the transfer film 14, the lower surface of the glue layer 12 made of a pressure-sensitive glue is glued to the surface of the transfer target O, and, at this time, it is preferable to apply pressure only within the range of the image layer 13. The pressure may be applied by rubbing with a fingertip, but it is preferable to evenly apply pressure using, for example, a roller, a rubbing pad for printing, etc. having smoothness and appropriate elasticity so as not to cause wrinkles and deformation on the image layer 13.

FIG. 8 is a cross-sectional view showing a film peeling step of peeling the transfer film 14 after pressure-bonding the image transfer sheet 1. When the transfer film 14 is peeled off after the image transfer sheet 1 is pressure-bonded, the image layer 13 remains on the surface of the transfer target O while being glued by the glue layer 12, and the image transfer is completed. Meanwhile, the glue layer 12 in a range where the image layer 13 is not present is kept glued to the transfer film 14 and removed from the surface of the transfer target O, and thus it is possible to prevent the excessive glue from remaining on the outside of the image. It should be noted that coating may be applied to the surface of the transfer target O after the completion of the transfer in order to increase the scratch resistance of the image layer 13 after the transfer and to prevent peeling of the image layer 13 due to a decrease in the adhesive strength caused by deterioration of the glue layer 12.

Second Embodiment

Figure 9A:
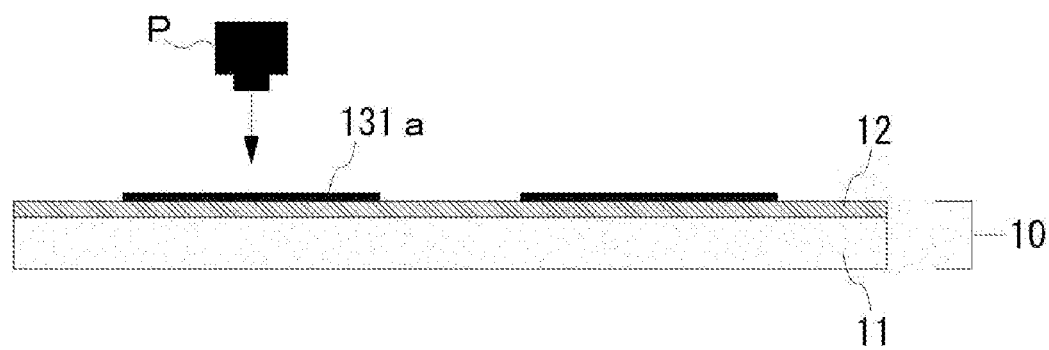
FIGS. 9A to 9C are cross-sectional views showing the printing step and the attaching step for an image transfer sheet 2 according to the second embodiment.
Figure 9B:
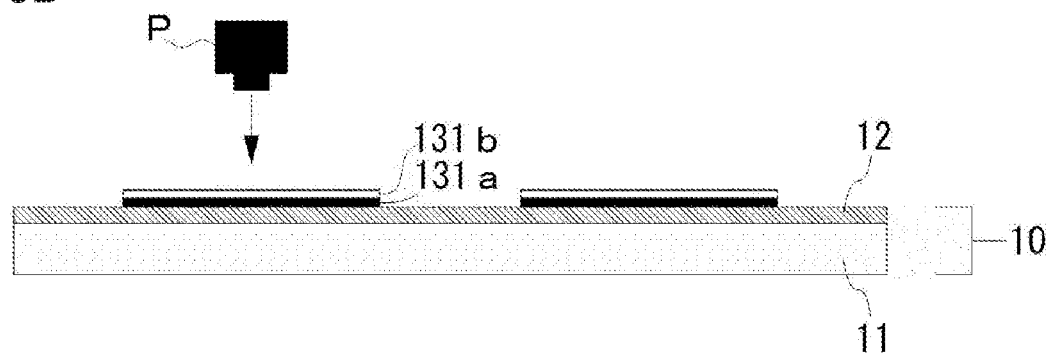
Figure 9C:
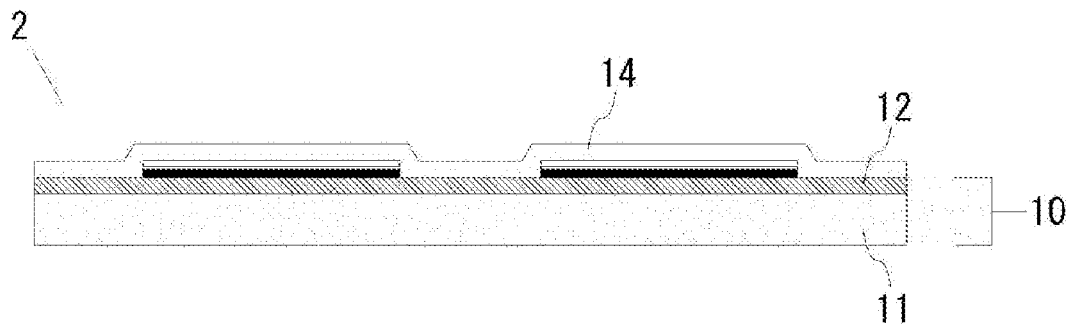
Figure 10A:
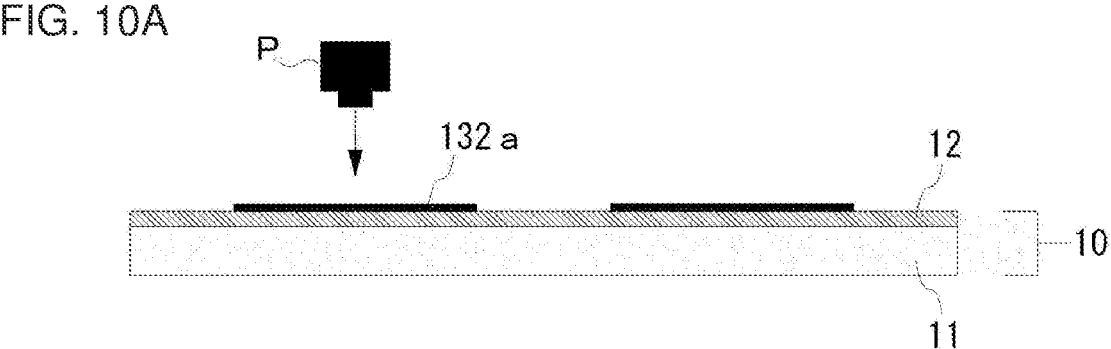
FIGS. 10A to 10D are cross-sectional views showing the printing step and the attaching step for an image transfer sheet 3 according to the third embodiment.
Figure 10B:
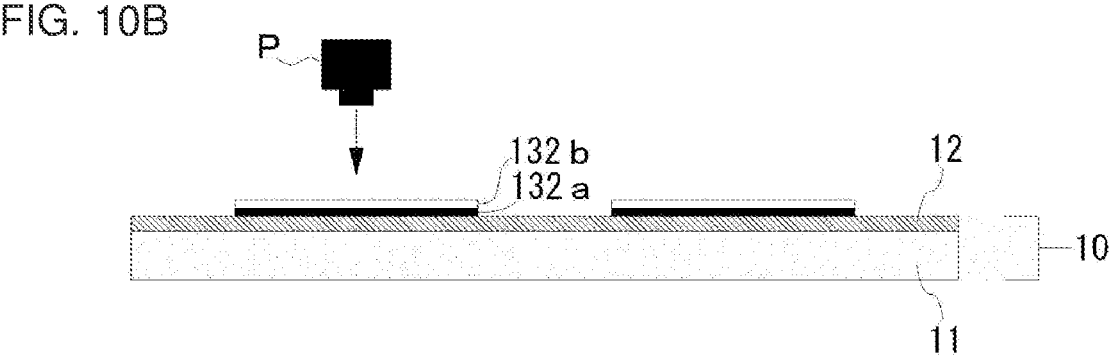
Figure 10C:
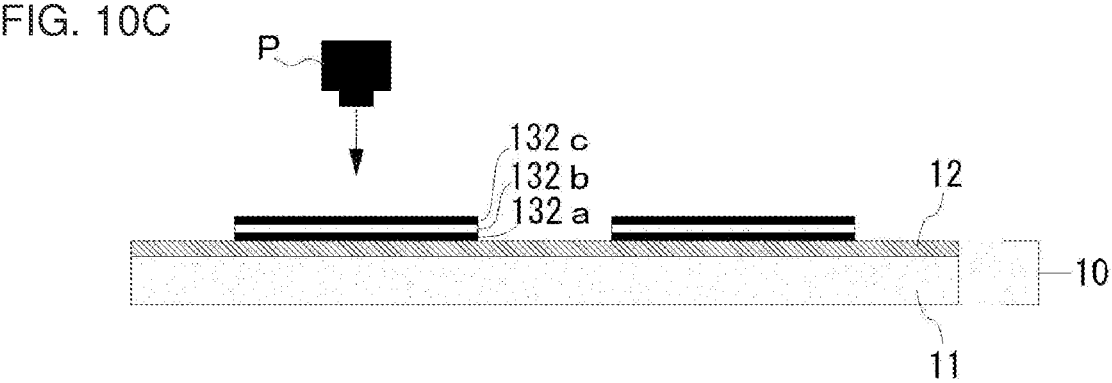
Figure 10D:
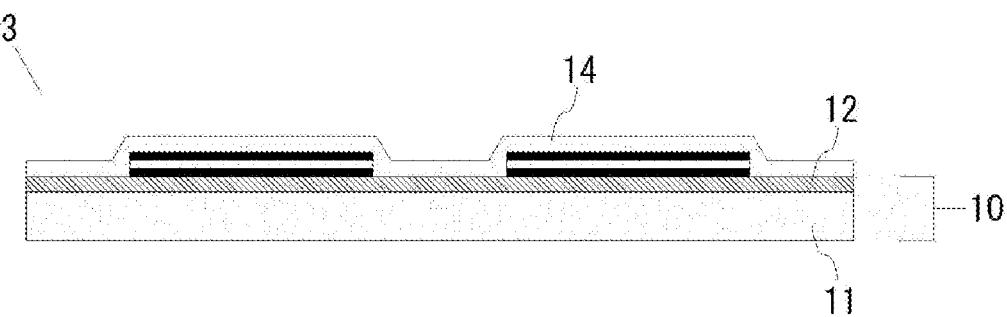

FIG. 9 is a cross-sectional view showing only the printing step and the attaching step in a manufacturing method for an image transfer sheet 2 according to a second embodiment of the present invention. The release paper removal step and subsequent steps are the same as those in the first embodiment. The second embodiment describes the process of manufacturing an image transfer sheet 2 for double-side printed images, for transferring images so that the images are visible from both sides of a transfer target O when the transfer target O is, for example, transparent glass.

The configuration of the printing step of the second embodiment is basically the same as that of the first embodiment, but the image layer has a two-layer structure. More specifically, a first image layer 131a is printed, dried and cured in a printing step (2a), and then a second image layer 131b is printed over the first image layer 131a in a printing step (2b).

In the case where the image layers 131a and 131b are formed by UV printing, UV ink can make the thickness of each of the image layers thicker compared to toner of a laser printer or ink droplets of an ink jet printer, and, after the first image layer 131a is dried and cured immediately after UV irradiation, even when the second image layer 131b is printed over the first image layer 131a, there is a little possibility that the inks of both the image layers interfere and mix with each other. Hence, even if the image layers of the double layer structure is transferred to a transfer target having high transparency such as glass, each of the image layers viewed from both sides of the transfer target is clearly visible without the image layer on the opposite side seen therethrough.

Third Embodiment

FIG. 10 is a cross-sectional view showing only the printing step and the attaching step in a manufacturing method for an image transfer sheet 3 according to a third embodiment of the present invention. The release paper removal step and subsequent steps are the same as those in the first embodiment. Similarly to the second embodiment, the third embodiment describes the process of manufacturing the image transfer sheet 3 for double-side printed images, for transferring images so that the images are visible from both sides of a transfer target O when the transfer target O is, for example, transparent glass.

In the configuration of the printing step of the third embodiment, the image layers are also two layers as in the second embodiment, but a masking layer is printed between the two image layers. More specifically, after printing, drying and curing a first image layer 132*a* in a printing step (3*a*), a masking layer 132*b* is printed, dried and cured over the first image layer 132*a* in a printing step (3*b*), and then a second image layer 132*c* is printed over the masking layer 132*b* in a printing step (3*c*) in a similar manner.

The masking layer 132*b* is a layer of arbitrary color that is not transparent, and may be of a single color or multi-color. By appropriately selecting a color for the masking layer 132*b* according to the colors of the two image layers, it is possible to impart visual changes to the images of both the image layers, and it is possible to create a highly designable transfer sheet with double-side images. For example, when the color of the masking layer 132*b* is white, it is possible to improve color appearance of the first image layer 132*a* and the second image layer 132*c*. When the color of the masking layer 132*b* is silver, it is possible to show the images of both the image layers in metallic tones, but, when the colors of the images or letters of both the image layers are white, the masking layer 132*b* may be black.

In the third embodiment, if the masking layer 132*b* is made an opaque color with low translucency, when the image layer is seen from one side of the transfer target, it is possible to prevent the image layer on the opposite side from being seen through the image layer in a superimposed manner. Hence, if each of the first image layer 132*a*, the masking layer 132*b* and the second image layer 132*c* is sufficiently dried and cured and then printed sequentially, the printing method is not necessarily limited to UV printing, and printing using a laser printer or an inkjet printer is also applicable.

Although the specific configurations of the image transfer sheets, the manufacturing method for the same, and the image transfer method according to the present invention have been described above, the present invention is not limited to the above embodiments, and it is possible to make modifications and changes within the scope of the technical idea of the present invention, such modifications and changes belonging to the technical scope of the present invention. In the present invention, by forming an image layer by UV printing, a highly stereoscopic image obtained by thick raised printing, which is a feature of UV printing, can be transferred as it is to the surface of a transfer target, and therefore it is possible to achieve improved texture of design, particularly for package printing. However, printing of the image layer is not necessarily limited to thick raised printing, and even when the image layer has a normal thickness, the production efficiency of the image transfer sheet can be improved by the feature of UV printing that dries and cures in a short time. Further, the image layer may be formed by general toner of a laser printer or ink droplets of an ink jet printer as long as a non-contact printing method is used. As described above, in the case when an image transfer sheet for double-side print images is manufactured without placing a masking layer between image layers, it is desirable to form the image layers by UV printing.

INDUSTRIAL APPLICABILITY

According to the present invention, an image printable by a non-contact printer can be transferred such that only an image layer formed of an ink without using a carrier, such as paper, is transferred to a transfer target. In particular, a thick image layer formed by UV printing can be transferred as if the image layer was printed directly, and therefore the present invention is effective for improving designability by printing of a stereoscopic image for package printing, etc. Further, according to the completed image transfer sheet, the image can be easily transferred to a desired transfer target without requiring a special tool, or optical or chemical treatment, and thus the present invention can be simple transfer-printing means which can replace conventional products, such as cutting sheets, seals and stickers, which have images printed on a sticky carrier.

REFERENCE SIGNS LIST

P Printer head
O Transfer target
1 Image transfer sheet (the first embodiment)
2 Image transfer sheet (the second embodiment)
3 Image transfer sheet (the third embodiment)
10 Sticky sheet
11 Release paper
12 Glue layer
13 Image layer (the first embodiment)
131*a* First image layer (the second embodiment)
131*b* Second image layer (the second embodiment)
132*a* First image layer (the third embodiment)
132*b* Masking layer (the third embodiment)
132*c* Second image layer (the third embodiment)
14 Transfer film

What is claimed is:

1. An image transfer sheet, comprising
   a release paper;
   a glue layer having a lower surface removably glued to an upper surface of the release paper;
   a first image layer provided partially and directly on the glue layer, the first image layer having a first image formed thereon;
   a second image layer provided directly on the first image layer, the second image layer having a second image formed thereon, the second image being different from the first image formed on the first image layer; and
   a transfer film having a highly adhesive property with respect to the glue layer, and having a release property, a lower surface of the transfer film being in contact with the second image layer at a portion where the second image layer is present and in contact with the glue layer at a portion where the second image layer is not present, the transfer film being peelable from the second image layer due to the release property.

2. The image transfer sheet according to claim 1, wherein each of the first image layer and the second image layer is made of a UV ink by a UV printer.

3. The image transfer sheet according to claim 1, further comprising a masking layer disposed between the first image layer and the second image layer, the masking layer being not transparent so as to prevent the first image formed on the first image layer from being seen from a side of the second image layer through the masking layer.

4. The image transfer sheet according to claim 3, wherein each of the first image layer and the second image layer is made of a UV ink by a UV printer.

5. The image transfer sheet according to claim 1, wherein a thickness of the transfer film is in a range of 12 μm to 100 μm.

6. The image transfer sheet according to claim 1, wherein the first image layer is made of an ink printed on an upper surface of the glue layer by a non-contact printer.

7. The image transfer sheet according to claim 5, wherein the thickness of the transfer film is in a range of 12 µm to 50 µm.

8. The image transfer sheet according to claim 5, wherein a thickness of the glue layer is in a range of 10 µm to 100 µm.

9. The image transfer sheet according to claim 5, wherein a thickness of the glue layer is approximately 50 µm.

* * * * *